United States Patent [19]
Isobe et al.

[11] Patent Number: 5,373,391
[45] Date of Patent: Dec. 13, 1994

[54] POLYGON MIRROR WITH EMBEDDED YOKE

[75] Inventors: Soichi Isobe, Kanagawa; Kimio Komata, Saitama; Toshiaki Ishii; Yuuichi Komai, both of Kanagawa, all of Japan

[73] Assignee: Ebara Corporation, Tokyo, Japan

[21] Appl. No.: 22,136

[22] Filed: Feb. 25, 1993

[30] Foreign Application Priority Data

Feb. 26, 1992 [JP] Japan .................... 4-75322

[51] Int. Cl.$^5$ ............................................ G02B 7/18
[52] U.S. Cl. ...................... 359/216; 359/198; 359/200; 359/218
[58] Field of Search ............ 359/216, 217, 218, 219, 359/200, 198, 197, 855

[56] References Cited

U.S. PATENT DOCUMENTS

| | | | |
|---|---|---|---|
| 4,523,800 | 6/1985 | Yamashita et al. | 359/200 |
| 4,984,881 | 1/1991 | Osada et al. | 350/616 |

FOREIGN PATENT DOCUMENTS

| | | |
|---|---|---|
| 2722821 | 12/1977 | Germany . |
| 62-41118 | 3/1987 | Japan . |
| 62-71614 | 5/1987 | Japan . |
| 62-94315 | 6/1987 | Japan . |
| 62-176821 | 11/1987 | Japan . |
| 62-176822 | 11/1987 | Japan . |
| 63-56158 | 3/1988 | Japan . |
| 63-81316 | 4/1988 | Japan . |
| 63-241515 | 10/1988 | Japan . |
| 63-241516 | 10/1988 | Japan . |
| 63-241517 | 10/1988 | Japan . |
| 63-241518 | 10/1988 | Japan . |
| 63-257716 | 10/1988 | Japan . |
| 63-257717 | 10/1988 | Japan . |
| 63-259617 | 10/1988 | Japan . |
| 63-266420 | 11/1988 | Japan . |
| 64-10208 | 1/1989 | Japan . |
| 63-10209 | 1/1989 | Japan . |
| 64-10210 | 1/1989 | Japan . |
| 1-193811 | 8/1989 | Japan . |
| 2-300711 | 12/1990 | Japan . |
| 3-42419 | 9/1991 | Japan . |
| 3-220518 | 9/1991 | Japan . |

OTHER PUBLICATIONS

Patent Abstracts of Japan, vol. 13, No. 303 (P-896) Jul. 12, 1989.
Patent Abstracts of Japan, vol. 16, No. 121 (P-1329) Mar. 26, 1992.
Patent Abstracts of Japan, vol. 13, No. 85 (P-834) Feb. 27, 1989.

*Primary Examiner*—Eugene R. LaRoche
*Assistant Examiner*—Christopher R. Glembocki
*Attorney, Agent, or Firm*—Wenderoth, Lind & Ponack

[57] ABSTRACT

A polygon mirror is made up of a rotor including a ceramic ring, a yoke and a mirror surface formation member. The yoke and the mirror surface formation member are secured to an outer periphery of the ceramic ring. A radial dynamic pressure bearing is defined by an inner periphery of the ceramic ring and an outer periphery of the fixing shaft. A thrust dynamic pressure bearing is defined by both end surfaces of the ceramic ring and surfaces of a thrust plate fixedly secured to the stator and confronting both end surfaces of the ceramic ring. The ceramic ring, the yoke and the mirror surface formation member are integrated by the material making up the mirror surface formation member during the molding of the member to form the rotor.

15 Claims, 3 Drawing Sheets

POLYGON MIRROR WITH EMBEDDED YOKE

BACKGROUND OF THE INVENTION

Field of the Invention

The present invention relates to a polygon mirror serving as a rotor in a polygon mirror scanning motor.

Prior Art

FIG. 2 is a sectional view of such a rotor in a conventional polygon mirror scanning motor. In FIG. 2, reference numeral 1 denotes a ceramic ring. A yoke 2 is shrink-fitted onto the ceramic ring 1. Then, a higher degree of planeness and surface roughness are imparted to the surfaces of the yoke 2 and a yoke 5 which are to contact a mirror surface formation member 3 defining a mirrored surface 4. The mirror surface formation member 3 is firmly clamped between the yoke 2 and the yoke 5 with a plurality of screws 16. Furthermore, a rotor magnet 6 having a plurality of magnetic poles of the motor is fixedly secured to the underside of the yoke 5.

FIG. 3 is a sectional view of a polygon mirror scanner motor employing the rotor shown in FIG. 2. A supporting shaft 8 fixed to a mount 7 extends through the ceramic ring 1. A radial bearing member 9 is firmly secured to the supporting shaft 8 and the ceramic ring 1. Moreover, thrust plates 10 and 11 are fixedly secured to the supporting shaft 8 so as to confront top and bottom end surfaces of the ceramic ring 1, respectively. A thrust dynamic pressure bearing is defined by the top and bottom end surfaces of the ceramic ring 1 and the respective confronting surfaces of the thrust plates 10 and 11. A radial dynamic pressure bearing is defined by the inner periphery of the ceramic ring 1 and the outer periphery of the radial bearing member 9. Reference numeral 12 designates a fixing bolt for fixing the thrust plates 10 and 11, the radial bearing member 9, and mounting plate 13 to the supporting shaft 8. A stator coil 14 is arranged on the top surface of the mount 7 so as to confront the rotor magnet 6. Reference numeral 15 indicates a cover.

In the above-described polygon mirror scanner motor, when the stator coil is sequentially energized, the inner periphery of the ceramic ring 1 of the rotor is supported on the radial bearing member 9, and the top and bottom end surfaces of the rotor are supported on the confronting surfaces of the thrust plates 10 and 11 for rotation. It is to be noted that the supporting shaft 8 and the radial bearing member 9 are collectively referred to as a fixing shaft, although the supporting shaft 8 may solely (without the radial bearing member 9) comprise the fixing shaft. In this case, the fixing shaft (supporting shaft) serves also as the radial bearing member.

The conventional rotor, that is, the polygon mirror described above, has the following disadvantages.

(1) Since the yoke 2 is shrink-fitted onto the ceramic ring 1, the outer diameter of the ceramic ring 1 and the inner diameter of the yoke 2 must be finished with a higher degree of roundness, concentricity, surface roughness, and dimensional tolerances, which contributes to high machining costs for the ceramic ring 1 and the yoke 2.

(2) Furthermore, after the shrink-fitting of the yoke 2 onto the ceramic ring 1, the surface of the yoke 2 in contact with the mirror surface formation member 3 must be subjected to a secondary machining operation to obtain strict planeness and surface roughness. Additionally, an additional assembly step is created by the need to thread the screw 16, securing the mirror surface formation member 3 to the yoke 5, with a predetermined controlled torque. Moreover, the rotor as a whole might be unbalanced due to looseness in the fitting section which is inevitably created in the assembly irrespective of the dimensional accuracy of the parts themselves, requiring numerous steps to correct the imbalance.

(3) Furthermore, depending on the degree to which the screw 16 is tightened, the mirror surface 4 may present a minute deformation, which in particular exerts a remarkable adverse influence, at the time of actual rotation, on the surface stability and jitter characteristic of the motor. The mirror surface formation member 3 must be provided with several through-holes for receiving several screws, thereby requiring a large number of machining steps, including the steps of processing the corners after the holes are formed. As a result, the manufacturing cost of the mirror is high.

(4) Moreover, the yoke 2 has a smaller height than the ceramic ring 1 when the shrink-fitting is performed, and hence only a portion of the ceramic ring is subjected to a shrink-fit. Thus, an uneven stress due to shrink-fitting is inevitably applied to the ceramic ring, which may possibly produce a crack in the ceramic ring 1 in an extreme case. In addition, the inner peripheral surface and the top and bottom surfaces of the ceramic ring 1 are liable to be deformed, which results in uneven thrust clearance and radial clearance between the rotor and the stator when incorporated into the scanner motor, which in turn adversely influences the rotational displacement of the motor. This is a cause of poor surface stability and jitter characteristic of the motor.

SUMMARY OF THE INVENTION

In view of the foregoing, an object of the present invention is to provide a polygon mirror which is easy to machine, requires only a few steps to assemble, and exhibits an extremely superior rotational performance.

In order to achieve this object, a polygon mirror according to the present invention comprises a rotor including a ceramic ring, and yokes and a mirror surface formation member secured to the outer periphery of the ceramic ring; a stator having a fixing shaft passing through the ceramic ring, a radial dynamic pressure bearing being defined by the inner periphery of the ceramic ring and the outer periphery of the fixing shaft; a thrust dynamic pressure bearing defined by both end surfaces of the ceramic ring and surfaces of thrust plates fixedly secured to the stator and confronting the end surfaces of the ceramic ring, respectively, and wherein the ceramic ring, the yokes and the mirror surface formation member are integrated by molding the material making up the mirror surface formation member to the ceramic ring and the yokes.

According to the present invention, the ceramic ring, the yokes and the mirror surface formation member are integrated by the material making up the mirror surface formation member in molding the mirror surface formation to thereby form the polygon mirror member. Hence, the number of parts, the number of steps for machining the parts, and the number of steps for assembling them are less than in the prior art.

Moreover, molding the material, such as aluminum, over the entire axial length of the ceramic ring to form the mirror surface formation member does not produce cracks in the ceramic ring, due to the uniformity of the thermal stress applied to the ceramic ring in its axial direction. Additionally, a uniform deformation in the inner circumferential and upper and lower end surfaces results in a uniform thrust clearance of the thrust bearing and a radial clearance of the radial bearing when the mirror is used in the scanner motor shown in FIG. 3, thus ensuring a uniform thrust between the rotor and the stator of the motor and a clearance in the radial direction such that the motor will exhibit an improved surface stability and jitter characteristic and thus will be able to cope with high-speed rotation.

DETAILED DESCRIPTION OF THE PREFERRED EMBODIMENTS

Figure 1:
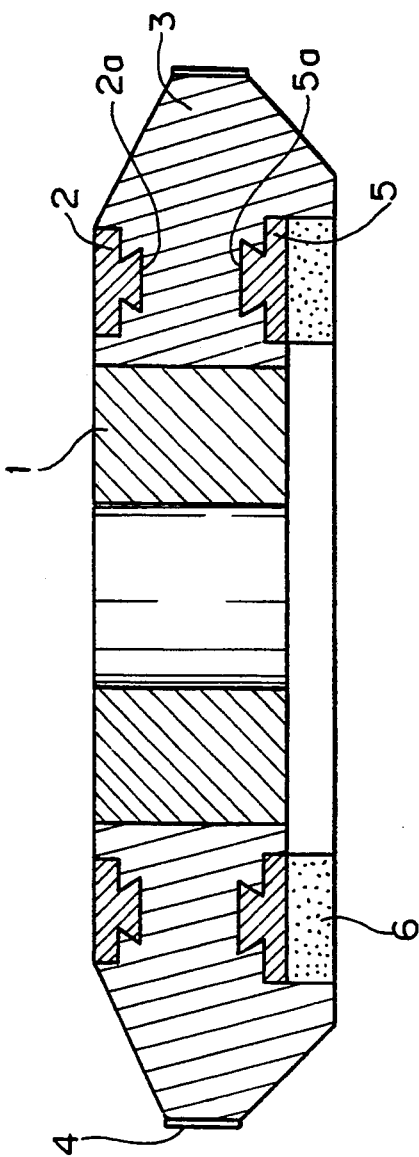
FIG. 1 is a sectional view of a polygon mirror scanner motor rotor including a polygon mirror according to the present invention.
Figure 2:
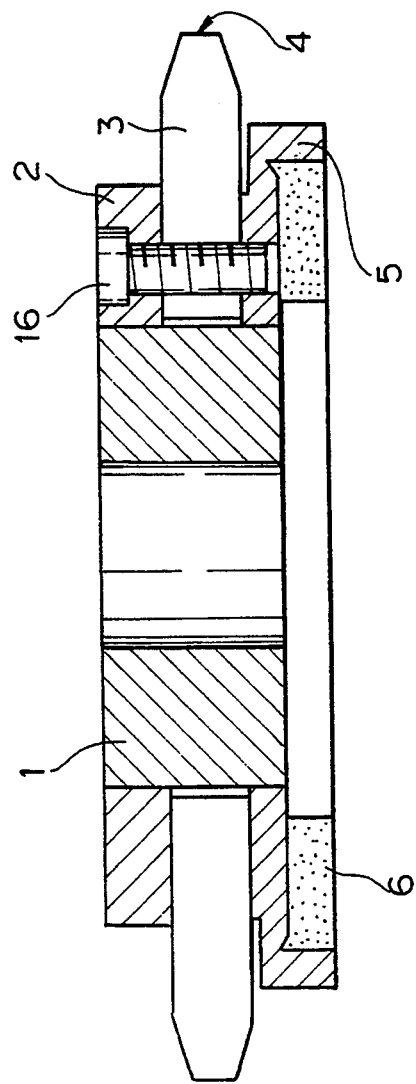
FIG. 2 is a sectional view of a conventional polygon mirror scanner motor rotor.

A preferred embodiment of the present invention will be described below with reference to the drawings. FIG. 1 is a sectional view of a polygon mirror scanner motor rotor incorporating a polygon mirror according to the present invention. In FIG. 1, elements designated by the same reference numerals as in FIG. 2 represent the same or corresponding elements.

As shown in FIG. 1, the rotor comprises a ceramic ring 1, yokes 2 and 5, and a rotor magnet 6 which are molded with aluminum making up a mirror surface formation member 3 so as to integrate these components. Incidentally, although the rotor magnet is also molded with the aluminum making up the insert formation member 3 in this case, only the ceramic ring 1, and yokes 2 and 5 may be molded with the aluminum making up the mirror surface formation member 3 in manufacturing the polygon mirror with the rotor magnet 6 being provided separately after the formation of the polygon mirror.

Furthermore, in order to enhance the strength (bonding strength between the ceramic ring 1 and the mirror surface formation member 3) obtained after the molding process, the outer periphery (not shown) of the ceramic ring 1 may be formed with a notch or may be provided with a surface roughness. The yokes 2 and 5 include respective wedge-shaped protrusions 2a and 5a which prevent the yokes 2 and 5 from disengaging from the mirror formation member after the molding process.

Furthermore, the rotor is perfectly formed in a vertically symmetrical manner, and has dynamic balance correction points in place. Moreover, the rotor magnet 6 is not allowed to be exposed after the molding process of forming the mirror formation member 3, so as to prevent disengagement therefrom.

After the integration of the ceramic ring 1, the yokes 2 and 5, and the rotor magnet 6 with the aluminum making up the mirror formation member 3 as described above, their surfaces are machined and a mirrored surface 4 is finally formed on member 3 by means of vapor deposition.

The molding of the ceramic ring 1 and yokes 2 and 5 with aluminum making up the mirror formation member 3 eliminates not only the necessity of providing a plurality of screws but also the necessity of a difficult fastening operation in which screw torque is controlled.

Furthermore, the yokes 2, 5 are molded from aluminum to ensure a simplified configuration, and the surfaces in contact with the mirror surface formation member 3 do not require a highly accurate finish as in the prior art, which contributes to keeping the manufacturing costs for these parts down.

Moreover, the yoke 2 is not shrink-fitted onto the ceramic ring 1 as in the prior art, and hence there is no need for a secondary machining operation. That is, after the molding process, the machining is carried out and completed, and the mirrored surface 4 is then finally formed by vapor deposition. Since the machining and the vapor deposition processes are carried out on the ceramic ring 1 undergoing very little deformation, the rotor can be well-balanced and the mirrored surface 4 can be formed with high accuracy. Therefore, the dynamic balance of the rotor can be easily corrected. In addition, there is no need for the provision of a through-hole in the mirror formation member 3 and for the step of machining the corners as in the prior art.

Figure 3:
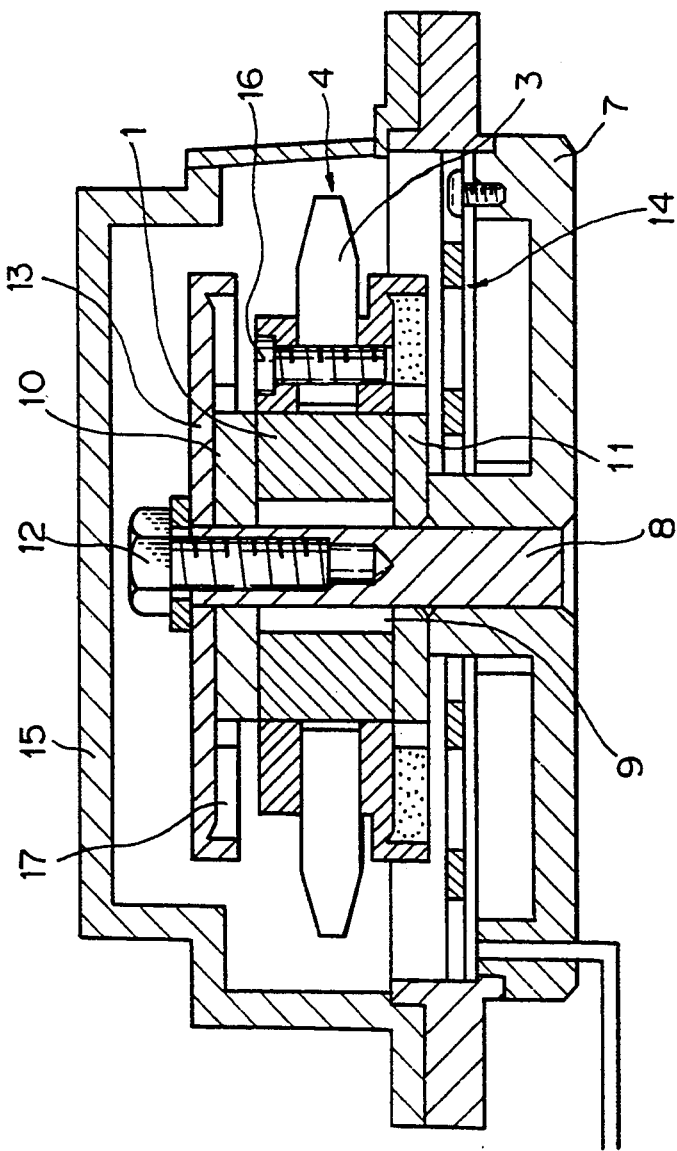
FIG. 3 is a sectional view of the polygon mirror scanner motor employing the rotor shown in FIG. 2.

Furthermore, because shrink-fitting is not involved, the accuracy in machining the outer diameter of the ceramic ring 1 and the inner diameter of the yoke is not critical. Moreover, the molding of the aluminum over the entire axial length of the ceramic ring will not produce cracks in the ceramic ring, due to the uniformity in the thermal stress applied to the ceramic ring 1 in its axial direction. Additionally, a uniform deformation in the inner circumferential and upper and lower end surfaces of the ceramic ring results in a uniform thrust clearance of the thrust bearing and a radial clearance of the radial bearing when incorporated into a scanner motor of the type shown in FIG. 3, thus ensuring a uniform thrust between the rotor and the stator of the motor and a clearance in the radial direction. Furthermore, because the mirror surface formation member 3 is not positioned between the yokes 2 and 5 and clamped to them with a plurality of screws as in the prior art, the mirror surface is free from any deformation. Accordingly, the motor will exhibit improved surface stability and jitter characteristic.

The speed of rotation of the conventional polygon mirror scanner motor is limited due to the poor surface stability and jitter characteristic of the motor caused by an interference between the parts, differences in thermal deformation and the like under a centrifugal force. Such problems are overcome in this embodiment since the parts are molded together by the aluminum forming the mirror surface formation member. Moreover, the streamlined configuration of the rotor suppresses drag during rotation as well as an increase in temperature arising therefrom. It is thus possible to obtain a high speed rotation.

It is to be noted that although the material making up the mirror surface formation member 3 is aluminum in the above-described embodiment, another metal or resin may be used instead.

Of course, other changes and modifications will become apparent to those of ordinary skill in the art. All such changes and modifications are seen to be within the true spirit and scope of the invention as defined by the appended claims.

What is claimed is:

1. A polygon mirror comprising: a rotor including a ceramic ring, a mirror surface formation member constituted by a body of molded material integral with and extending around the outer circumferential surface of said ceramic ring, a mirrored surface extending circumferentially of said mirror surface formation member in the shape of a polygon, and at least one yoke embedded in said mirror surface formation member; a stator including a shaft extending through said ceramic ring, a radial dynamic pressure bearing being defined by the inner circumferential surface of said ceramic ring and the outer circumferential surface of said shaft; and thrust plates fixed to said stator, said thrust plates having thrust surfaces confronting end surfaces of said ceramic ring, respectively, a thrust dynamic pressure bearing being defined by said confronting thrust and end surfaces.

2. A polygon mirror as claimed in claim 1, wherein said mirrored surface is defined by a layer of material integral with and extending around said mirror surface formation member.

3. A polygon mirror as claimed in claim 1, wherein each said yoke has a main body, and a wedge-shaped protrusion protruding from said main body into said mirror surface formation member so as to prevent the yoke from disengaging from the mirror surface formation member.

4. A polygon mirror as claimed in claim 1, wherein said rotor includes a magnet integral with said mirror surface formation member.

5. A polygon mirror as claimed in claim 1, wherein the material of said mirror surface formation member is aluminum.

6. A polygon mirror as claimed in claim 1, wherein said yoke is disposed radially outwardly of the outer circumferential surface of said ceramic ring with a portion of said mirror surface formation member being interposed, in the radial direction of said ceramic ring, between said yoke and said ceramic ring.

7. A rotor of a polygon mirror scanner motor, said rotor comprising: a ceramic ring; a mirror surface formation member constituted by a body of molded material integral with and extending around the outer circumferential surface of said ceramic ring, a mirrored surface extending circumferentially of said mirror surface formation member in the shape of a polygon, and at least one yoke embedded in said mirror surface formation member.

8. A rotor as claimed in claim 7, wherein said mirrored surface is defined by a layer of material integral with and extending around said mirror surface formation member.

9. A rotor as claimed in claim 7, wherein each said yoke has a main body, and a wedge-shaped protrusion protruding from said main body into said mirror surface formation member so as to prevent the yoke from disengaging from the mirror surface formation member.

10. A rotor as claimed in claim 7, wherein said yoke is disposed radially outwardly of the outer circumferential surface of said ceramic ring with a portion of said mirror surface formation member being interposed, in the radial direction of said ceramic ring, between said yoke and said ceramic ring.

11. A method of making a rotor of a polygon mirror scanner motor, said method comprising: providing a ceramic ring; positioning at least- one yoke radially outwardly of the outer circumferential surface of said ceramic ring; while said at least one yoke is positioned radially outwardly of the outer circumferential surface of said ceramic ring, forming a mirror surface formation member by molding material to the yoke and to the outer circumferential surface of said ceramic ring such that the at least one yoke becomes embedded in the material whereby the material of said mirror surface formation member unites said at least one yoke and said ceramic ring; and forming a mirrored surface on an outer circumferential surface of said mirror surface formation member, said mirrored surface extending in the shape of a polygon.

12. A method as claimed in claim 11, wherein said step of forming a mirrored surface comprises vapor deposition.

13. A method as claimed in claim 11, and further comprising providing a magnet, and wherein said step of forming a mirror surface formation member comprises molding the material of the mirror surface formation member to the magnet such that the magnet is also integrated with said yoke and said ceramic ring.

14. A method as claimed in claim 11, wherein said step of forming a mirror surface formation member comprises molding aluminum to the yoke and to the outer circumferential surface of said ceramic ring.

15. A method as claimed in claim 11, wherein said step of forming a mirror surface formation member includes molding the material to the yoke with a portion of the material being interposed, in the radial direction of the ceramic ring, between the at least one yoke and said outer circumferential surface.

* * * * *